April 4, 1961

L. E. DONAHUE 2,978,183

AIR CONDITIONING APPARATUS HAVING REMOTE
PILOT CONDITION SENSORS

Filed Feb. 4, 1959

INVENTOR.
LAWRENCE E. DONAHUE

BY
Joseph E. Ryan
ATTORNEY

INVENTOR.
LAWRENCE E. DONAHUE
ATTORNEY

United States Patent Office 2,978,183
Patented Apr. 4, 1961

2,978,183
AIR CONDITIONING APPARATUS HAVING REMOTE PILOT CONDITION SENSORS

Lawrence E. Donahue, Mount Prospect, Ill., assignor to Minneapolis-Honeywell Regulator Company, Minneapolis, Minn., a corporation of Delaware Filed Feb. 4, 1959, Ser. No. 791,086

9 Claims. (Cl. 236—13)

This invention relates to improved air conditioning apparatus and more particularly to apparatus designed to mix an air conditioning medium or mediums and/or distribute the same to a space to be air conditioned.

My prior Patent 2,828,076 on Air Conditioning Apparatus dated March 25, 1958 discloses an arrangement in which two different air conditioning mediums are controllably mixed and delivered to a space to be air conditioned. In apparatus of this type and also the type shown in the Joesting patent 2,835,449 entitled, "Air Blender For Air Conditioning Having Temperature And Pressure Control," dated May 20, 1958, it is necessary to locate the controls and sensors for the air conditioning apparatus within or near the valves comprising the same and this creates a problem in manufacture, adjustment and maintenance as well as installation. The present invention is directed to an air conditioning apparatus in which the sensing devices and the control apparatus may be located remote from the main valves associated mixing boxes or distribution units to simplify the adjustment, maintenance and improve the accuracy of the apparatus. Further because all of the controls do not have to be located in one point or associated with the main valves, the cost of manufacture is substantially reduced in simplicity in the design. It is therefore the object of this invention to provide an improved apparatus of this type in which the sensing devices or control devices are located remote from the main valving portion of the apparatus to provide for simplicity of design, easy installation and accuracy in adjustment and control. This and other objects have become apparent from the reading of the attached description together with the drawings wherein:

Figure 1:
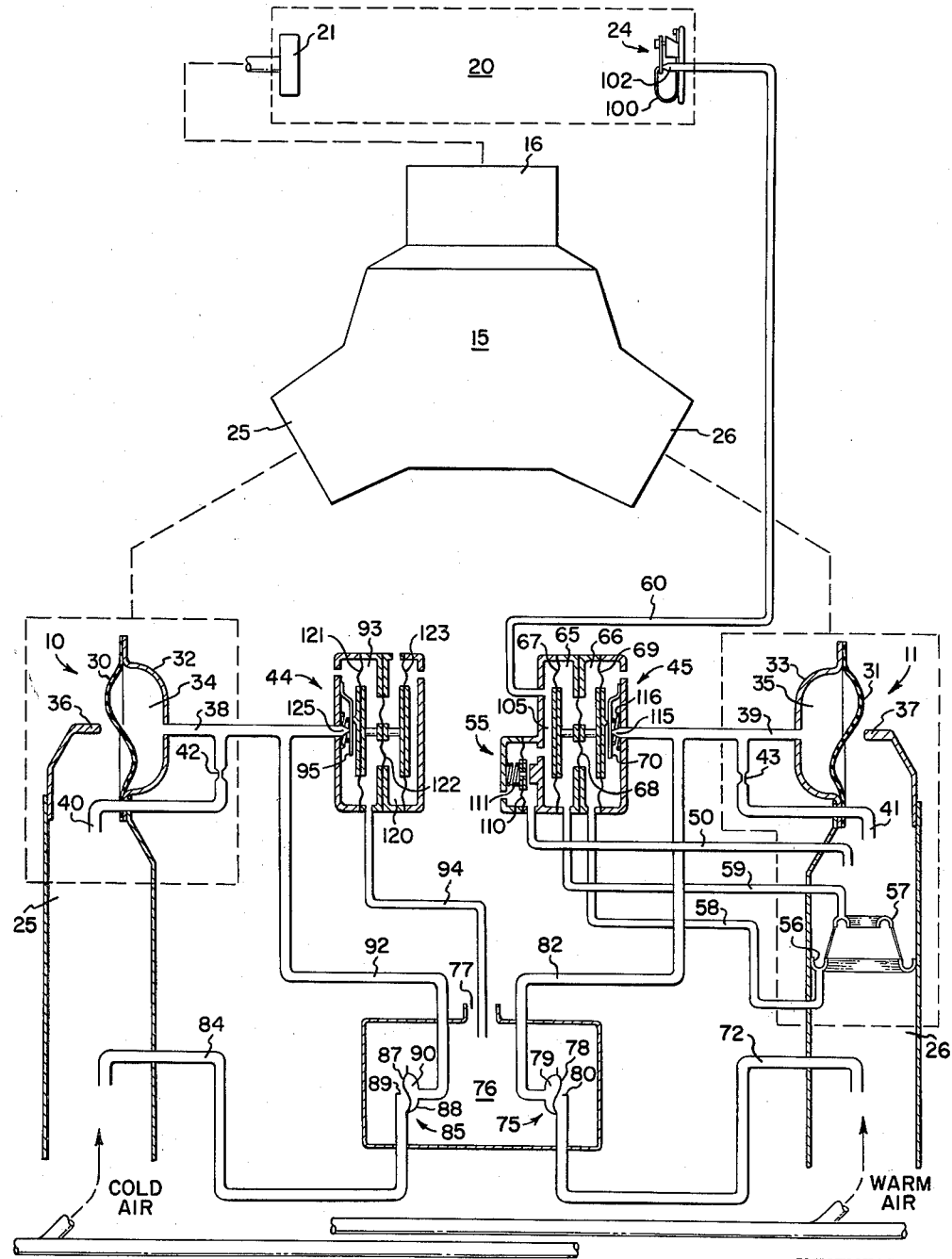
Figure 1 is a schematic disclosure of the apparatus in which the sensor from one of the main valves is located remote from the main valving apparatus.

In Figure 1 the improved air conditioning apparatus is shown schematically as using the type of main valve shown in the above mentioned Joesting patent. Two such valves 10 and 11 are disclosed as being included in a mixing chamber or blender box indicated in block 15 having an outlet 16 leading to the space indicated in phantom at 20 as the space to be air conditioned. The outlet includes a discharge orifice or grill 21 in the space into which the tempered air conditioning medium is discharged for air conditioning purposes. Also included in the space is a thermostat device or temperature controller 24 which responds to space temperature and operates to control the valve in the manner to be later described. The mixing chamber or blender box 15 includes two inlet conduits indicated generally at 25, 26 at the end of which are positioned the valves 10 and 11 in the box 15. The valves 10 and 11 are shown schematically in Figure 1 and set aside from the box for disclosure purposes. These valves are bladder type self-contained valves having diaphragms 30, 31 respectively which defined with the case or frames 32, 33 of the respective valves pressure or working chambers 34, 35 in which the tempered air under pressure actuates the diaphragm toward a cooperation portion of the valve or weir 36, 37 to permit or deter flow of the air conditioning medium from the respective ducts 25, 26 into the mixing chamber or box 15 and to the outlet 16. Connected to the pressure chambers 34, 35 or the frames 32, 33 are conduits 38, 39 respectively which have pressure taps 40, 41 extending to and located on the upstream side of the valves and including restrictions 42, 43 therein. The source of temperature medium to apply the working pressure to the chambers 34, 35 is picked up by the taps 40, 41 and fed to the conduits 38, 39 where the pressure therein is controlled by the associated air flow regulators or relays indicated at 44, 45 respectively. As in my above mentioned patent, the valves may be in a double diaphragm type and the pressure probes or sensors 40, 41 may be located in the weirs or portion of the valve against which the diaphragms operate.

In Figure 1 it will be also seen that in addition to the pressure taps 41 a second pressure tap or conduit 50 is included leading to the relay 45 and supplying an air source to the pressure regulator 55 shown in my above mentioned patent which in turn supplies air through the conduit 60 to the thermostat element 24. A pressure signal in proportion to the velocity or rate of flow through the valve 11 is obtained from static 56 and impact pressure 57 sensors which are connected to conduits 58, 59 to the relay chambers 65, 66 which are separated by diaphragms 67, 68, 69 and operate on the relay mechanism or flapper 70 to control branch line pressure to the working chamber 35 of valve 11.

In addition to the above, the warm air duct 26 has still another pressure sensor or conduit 72 positioned upstream of the valve 11. Conduit 72 supplies air conditioning medium to a small diaphragm valve unit 75 contained in a pilot chamber or box 76 having an outlet 77 therein. The small diaphragm valve 75 is similar to the valve 11 in design and operating characteristics and has a diaphragm 78, a working chamber 79 and a weir 80 with which the diaphragm cooperates with the working chamber 79 being connected by means of a conduit 82 to the branch conduit 39 supplying pressure to the working chamber 35 of valve 11. Thus the branch line pressure in conduit 39 supplied from the tap 41 and controlled by the relay 45 is also applied to valve 75 and hence it will assume the same operating position as the valve 11 to control a similar flow to pilot chamber 76 as the valve 11 controls a flow to the main box 15. The opposite or cold air valve indicated at 10 connected to the cold air duct or source 25 has a similar pressure probe 84 on the upstream side of the valve and positioned in duct 25 which supplies an air flow to a second small valve or pilot valve 85 positioned in the pilot chamber 76, the valve 85 having a diaphragm 87 positioned in the frame 88 and cooperating with a weir 89 to define a pressure chamber 90. Flow through the small valve 85 is fed to the chamber 76 to be vented to atmosphere through the outlet 77. Outlet 77 can also be vented or referenced to the downstream air pressure thus keeping the relationship between the pressure in the mixing chamber 15 and the pressure in the pilot chamber 76 the same. With this arrangement chamber 120 of regulator 44 should also be referenced to the pressure downstream of mixing chamber 15. The operation of the valve 85 is controlled by the pressure in the pilot chamber which is connected through a conduit 92 to the branch line 38 for the valve 10 wherein the pressure is controlled by the relay mechanism 44 and supplied from the sensing tap 40. The cold air regulator or relay 44 contains a chamber 93 to which is connected a conduit 94 leading to the outlet passage 77 of pilot chamber 76 wherein the output pressure of the pilot chamber is sensed and used to control the the pilot chamber which is connected through a contains a relay or flapper mechanism 95 cooperating with a nozzle to control the pressure in the branch line 38 for operation of valves 10 and 85. The pressures sensed at the outlet 77 is indicative of total flow from the combined valves 10 and 11 in that it senses the total flow from the valves 85, 75 simulating the operation of the valves 10 and 11 and permits the sensing of this pressure at a point remote from the main chamber such that the sensing probe may be accurately positioned and readily maintained. The relay 44 as in the above mentioned Donahue patent balances total flow pressure against a reference or atmospheric pressure to operate the mechanism 95 and control the operation of the relay 44.

The disclosure of Figure 1 shows the thermostat 24 schematically as including only a sensing element 100 cooperating with a nozzle 102 on the extremity of the conduit 60 to control branch pressure in a chamber 105 defined by the case and the diaphragm 67. The pressure regulator includes a diaphragm 110 operating against a spring 111 to control flow from the conduit 50 to the chamber 105 wherein the pressure is controlled by the thermostat 24. The pressure in chamber 105 for regulator or relay 45 is applied to the differential pressure between the chambers 65, 66 or the differential between the impact and static pressure sensed at the inlet to valve 11. The diaphragms 67, 68 and 69 defining chambers 65, 66 are connected through suitable connection means and position flapper 70 relative to a nozzle 115 in the relay 45 to control branch line pressure in the conduit 39. A spring 116 is positioned between the case and flapper 70 cooperates with these pressures to determine flapper position and hence branch line pressure.

The cold air regulator or relay 44 has a total impact pressure balanced against a chamber 120 vented to atmosphere with the diaphragms 121, 122 and 123 defining the chambers 93 and 120 to provide a pressure differential to move the connected diaphragms against the nozzle 125 for the relay 95 to control pressure in the branch line 38. Thus total flow pressure is sensed in the pilot chamber 76 containing the two valves 75, 85 which simulate the action of the main valves 10 and 11 but may be located remote from the main valves and outside the main chamber 15 or box to permit accurate simple adjustment and simplicity in manufacture and maintenance. This total flow pressure controls the flow of the cold air valve 10 while the warm air valve 11 is controlled by the velocity of flow therethrough reset by temperature requirements to provide a constant amount of warm air to the mixing chamber 15 in proportion to the desired temperature requirements with the total outflow from the box 15 being held constant as is shown in my preceding Patent 2,828,076.

Figure 2:
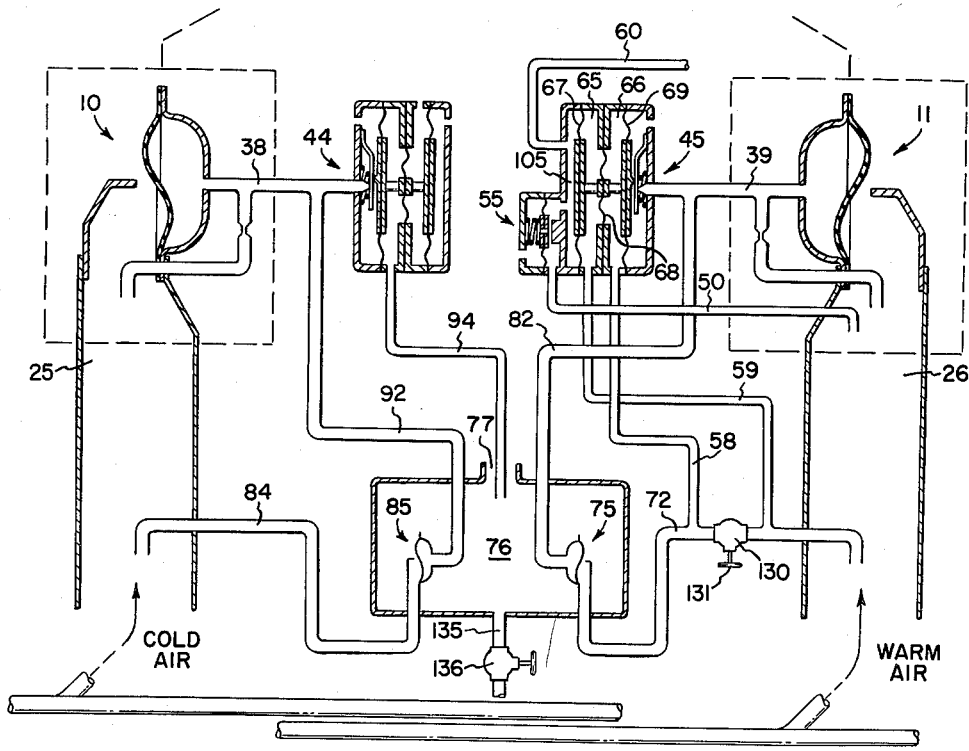
Figure 2 is a schematic disclosure of the second embodiment of the apparatus in which both sensors are remote from the main valving portion of the apparatus and, Figure 3 is a schematic disclosure of a single valve with a remotely located sensing apparatus to maintain a constant volume flow of tempered air conditioning medium at a desired temperature level.

The modification of the apparatus or the embodiment of the invention which is shown in Figure 2 utilizes many of the parts that have been described in Figure 1, and hence the similar parts will not be discussed in detail again. In this embodiment, the main difference resides in the type and location of the velocity pressure sensor which controls the flow regulator for the valve 11 together with the control by the thermostat. The valve 10 again is controlled by the relay 44 whose sensed pressure is the outlet pressure at the pilot chamber 76 whose air containing the valves 85, 75 supplied with the air conditioning medium or source from the conduits 84, 72 common to the ducts 25, 26 respectively. The warm air valve 11, in place of the venturi type sensor having impact and static pressure probes, now has its sensing conduits 58, 59 connected across a warm air adjustment valve 130 positioned in the conduit 72 supplying the warm air temperature medium to the small valve 75 in the pilot chamber 76. Small valves 75 and 85 are again shown as controlled by branch line pressure in the main branch conduits 38, 39 through operation of the relays 44, 45. The drop across the warm air adjustment valve 130, which is adjustable by a mechanism 131, will supply the pressure differential simulating the rate of flow through the valve 11 which is in proportion to the flow through valve 75 to provide a velocity signal for operation of the relay 45 in the same manner as the pressures sensed at the sensors 56, 57 in Figure 1. In addition to the above, the pilot chamber 76 has a second conduit 135 connected thereto with an adjustment valve 136 included in the conduit to control the flow of air from the pilot chamber 76 to atmosphere similar to the discharge to the atmosphere from the outlet 77. This valve controls the total flow of adjustment valve and controls the pressure sensed in the conduit 94 controlling the relay 44. By adjusting the valve 136 more or less flow may be controlled from the outlet 77 to vary the pressure sensed in conduit 94 and hence the signal supplied to the regulator 44 to control the operation of valve 10. With this arrangement, warm air flow through valve 75 will provide a signal for the relay 45 from a point remote from the main warm air valve 11 which is similar to the flow through valve 11 and which is used to control the operation of valve 11. Further the pilot chamber 76 with its associated valve 75, 85 simulating the operation of both of the main valves 10 and 11 will supply a pressure signal to the relay 44 in proportion to the total outflow from the box 15 to control the valve 10. In operation this device operates in the manner similar to that of the embodiment of Figure 1.

Figure 3:
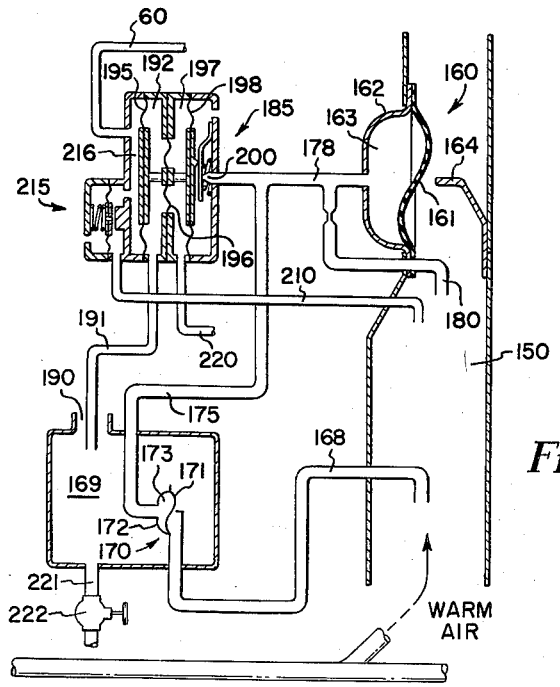

The embodiment shown in Figure 3 discloses a single valve controlling air from a source of temperature changing medium through a duct such as is indicated at 150, the valve being indicated at 160 comprising a diaphragm 161 defining with the valve casing 162 to a pressure chamber 163 with a diaphragm cooperating with the casing or weir portion 164 to a space to be air conditioned. The valve 160 can be equivalent of one-half of the double valve system shown in Figures 1 and 2 or could be used by itself to supply a constant amount of tempered air controlled or reset by the thermostat 24. In this embodiment, the single valve has a conduit 168 in duct 150 connected thereto leading to a pilot chamber 169 housing a small valve 170 having a diaphragm 171 and a casing 172 defining therewith a pressure chamber 173 which communicates with the pressure chamber 163, of the main valve 160 through a conduit 175 connected to the conduit 178 of the main valve which is supplied from a sensing probe or source 180 and in which the pressure is controlled by the relay mechanism 185. The pilot chamber 169 has an outlet 190 in which is positioned a sensing probe or conduit 191 leading to a pressure chamber 192 of the relay 185 defined by a pair of diaphragms 195, 196 with a second chamber 197 being formed between the diaphragm 196 and a third diaphragm 198 with the diaphragms 195, 196, 198 being connected together and cooperating with a nozzle 200 common to the branch conduit 178 such that the diaphragm movements will control main pressure in the conduit 178. In the relay 185 as in the relay 45 of the warm air regulator in Figures 1 and 2 main line pressure is also supplied to the relay. In Figure 3 a conduit 210 common to the inlet of the valve is connected to a pressure regulator or relay 215 associated with relay 185 to supply the regulated pressure to a chamber 216 defined between the diaphragm 195 and the casing of the regulator with the conduit 60 leading to the thermostat 24 such that the pressure in chamber 216 may be controlled by the thermostat and applied to the diaphragms to operate co-jointly with the pressure in chamber 192 from the pilot chamber 169 and a reference pressure supplied through a conduit 220 to the chamber 197 for operation of the relay 185. Also included in the pilot chamber 169 is a second conduit 221 having a valve 222 positioned therein to control flow of air from the chamber 169 and hence the pressure sensed the outlet 190 by the conduit 191 to the chamber 192. The arrangement of Figure 3, as indicated above, can be one-half of the double valve system in which the flow sensor through the valve is remote from the main valve and if used in the arrangement in a double valve would be equivalent of the warm air adjustment valve shown at 131.

In operation this valve will perform in a manner similar to each valve in the preceding embodiments in that the branch line pressure to the pressure chamber 163 of the valve 160 will be controlled by the relay whose pressure chambers receive pressure from the pilot chamber balanced against a reference pressure to move the combined diaphragms together with the pressure sensed in the chamber 216 and controlled by the thermostat 24 to operate the relay mechanism. The branch line pressure in the conduit 178 is also supplied to the pilot valve 170 such that its operation simulates the operation of valve 160 or flow to the mixing chamber and hence the space to be air conditioned. In considering this invention it should be remembered that the present disclosure is intended to be illustrative only and the scope of the invention should be determined only by the appended claims.

What is claimed is:

1. In an air conditioning system, a mixing chamber adapted to be connected to a space to be air conditioned and including a pair of inlets each containing a self contained diaphragm valve, a source of temperature changing medium connected to each of said valves and adapted to supply temperature changing mediums at different temperatures to said mixing chamber, conduit means positioned at the inlets to said mixing chamber for supplying temperature changing medium from said source to the operating chamber of said valves for operation of each of said valves, a pair of pneumatic relay means connected respectively to said supply conduit means for controlling the operation of said valves by varying a branch pressure in said conduit means, a pilot chamber means simulating said mixing chamber and positioned remote from said mixing chamber, further conduit means connected to each of said sources and to said pilot chamber, a pair of pilot diaphragm valves positioned at the inlets to said pilot chamber and having operating characteristics similar to said pair of self contained diaphragm valves in said mixing chamber and controlling flow through said further conduit means to said pilot chamber, outlet means in said pilot chamber, further connection means connecting said supply conduit means and said pilot diaphragm valves in said pilot chamber to control the operation thereof simultaneous with and similar to the operation of said valves in said mixing chamber, a pressure sensor in the outlet of said pilot chamber connected to one of said relay means for one of said pair of self contained valves to control the operation of the same, means responsive to the velocity of flow of the air conditioning medium through the other of said valves and connected to the other of said relays for controlling said other of said valves, and thermostat means included in the space to be air conditioned and connected to said last named relay means to control the operation of the same jointly with said velocity sensing means.

2. In an air conditioning system, a mixing chamber adapted to be connected to a space to be air conditioned and including a pair of inlets each containing a self contained diaphragm valve, a source of temperature changing medium connected to each of said valves and adapted to supply temperature changing mediums at different temperatures to be mixed within said mixing chamber and discharged to said space for air conditioning said space, conduit means positioned at the inlets to said mixing chamber for supplying temperature changing medium from said source to the operating chamber of said valves for operation of each of said valves, a pair of pneumatic relay means included in said supply conduit means for controlling the operation of said valves by establishing a branch pressure to vary diaphragm position and the operation of said valves, a pilot chamber means simulating said mixing chamber, further conduit means connected to each of said sources and to said pilot chamber, a pair of pilot diaphragm valves positioned at the inlets to said pilot chamber and having operating characteristics similar to said pair of self contained diaphragm valves in said mixing chamber and controlling flow through said further conduit means to said pilot chamber, outlet means in said pilot chamber, further connection means connected to said supply conduit means for said pair of self contained valves in which the working branch pressure is established for operation of said pilot diaphragm valves in said pilot chamber simultaneous with and similar to the operation of said valves in said mixing chamber, a pressure sensor in the outlet of said pilot chamber connected to one of said relay means for one of said pair of self contained valves to control the operation of the same, means indicative of the rate of flow through the other of said valves and connected to the other of said relay means associated therewith to control said other of said valves, and thermostat means included in the space to be air conditioned and connected to said last named relay means to control the operation of the same jointly with said rate of flow indicative means.

3. In an air conditioning system, a mixing chamber adapted to be connected to a space to be air conditioned and including a pair of inlets each containing a self contained diaphragm valve, a source of temperature changing medium connected to each of said valves and adapted to supply temperature changing mediums at different temperatures to be mixed within said mixing chamber and discharged to said space for air conditioning said space, conduit means positioned at the inlets to said mixing chamber for supplying temperatures changing medium from said source to the operating chamber of said valve for operation in each of said valves, a pair of pneumatic relay means included in said supply conduit means for controlling the operation of said valves by establishing a branch pressure to vary diaphragm position and the operation of said valves, a pilot chamber means simulating said mixing chamber, further conduit means connected to each of said sources and to said pilot chamber, a pair of pilot diaphragm valves positioned at the inlets to said pilot chamber and having operating characteristics similar to said pair of self contained diaphragm valves in said mixing chamber and controlling flow through said further conduit means to said pilot chamber, outlet means in said pilot chamber, connection means connected to said supply conduit means for said pair of self contained valves in which the working branch pressure is established for operation of said pilot diaphragm valves in said pilot chamber simultaneous with and similar to the operation of said valves in said mixing chamber, a pressure sensor in the outlet of said pilot chamber connected to one of said relay means for one of said pair of self contained valves to control the operation of the same, means indicative of the rate of flow through the other of said valves and connected to the other of said relay means associated therewith to control said other of said valves, thermostat means included in the space to be air conditioned and connected to said last named relay means to control the operation of the same jointly with said rate of flow indicative means, and adjustable valve means connected into said pilot chamber to permit flow from said box in addition to said outlet and adjust the signal sensed to said first named relay means.

4. In an air conditioning system, a mixing chamber adapted to be connected to a space to be air conditioned and including a pair of inlets each containing a self contained diaphragm valve, a source of temperature changing medium connected to each of said valves and adapted to supply temperature changing mediums at different temperatures to be mixed within said mixing chamber and discharged to said space for air conditioning said space, conduit means positioned at the inlets to said mixing chamber for supplying temperature changing medium from said source to the operating chamber of said valve for operation in each of said valves, a pair of pneumatic relay means included in said supply conduit means for controlling the operation of said valves by establishing a branch pressure to vary the diaphragm positioned in the operation of said valves, a pilot chamber means simulating said mixing chamber in position remote from said mixing chamber, further conduit means connected to each sources and to said pilot chamber, a pair of pilot diaphragm valves positioned at the inlets to said pilot chamber and having operating characteristics similar to said pair of self contained diaphragm valves in said mixing chamber and controlling flow through said further conduit means to said pilot chamber, outlet means in said pilot chamber, connection means connected to said supply conduit means for said pair of self contained valves in which the working branch pressure is established for operation of said pilot diaphragm valves in said pilot chamber simultaneous with and similar to the operation of said valves in said mixing chamber, a pressure sensor in the outlet of said pilot chamber connected to one of said relay means for one of said pair of self contained valves to control the operation of the same, additional valve means included in the connection from said source to said pilot valve in said pilot chamber associated with the other of said self contained diaphragm valves, pressure taps connected to either side of said additional valve means and to the other relay means for controlling the other of said self contained diaphragm valves, and thermostat means positioned in said space and adapted to control jointly with said sensed pressures from said additional valve means the operation of said relay means associated with another of said diaphragm valves.

5. In an air conditioning apparatus for controlling the delivery of air to a space and the temperature of the space, a mixing chamber having a discharge opening to said space, first and second conduit means containing tempered air to be delivered to said space and connected to said mixing chamber, said first and second conduit means each including valve means for controlling the amount of tempered air from said conduits to be delivered to said space, means for simulating the total flow from said mixing chamber through the discharge opening of the said mixing chamber including a remotely positioned chamber having a discharge to atmosphere and a source of air flows thereto similar to the flows in said first and second conduit means, a pair of pilot valves positioned in said remotely positioned chamber and having similar flow characteristics respectively to said valve means in said first and second conduit means, means including a sensor means responsive to the pressure in said remotely positioned chamber for controlling one of said valve means in said first conduit means and one of said pilot valve means, temperature responsive means responsive to the temperature of the space, pressure responsive means responsive to pressures in said second conduit means indicative of the rate of flow through the valve means therein, and means connected to and controlled jointly by said temperature responsive means and said pressure responsive means controlling said valve means in said second conduit means and the second of said pilot valves.

6. In an air conditioning apparatus for controlling the delivery of air to a space and the temperature of the space, a mixing chamber having a discharge opening to said space, first and second conduit means containing tempered air to be delivered to said space and connected to said mixing chamber, said first and second conduit means each including valve means for controlling the amount of tempered air from said conduits to be delivered to said space, means for simulating the total flow from said mixing chamber through the discharge opening of the said mixing chamber including a remotely positioned chamber having a discharge to atmosphere and a source of air flows thereto similar to the flows in said first and second conduit means, a pair of pilot valves positioned in said remotely positioned chamber and having similar flow characteristics respectively to said valve means in said first and second conduit means, means including a sensor means responsive to the pressure in said remotely positioned chamber for controlling one of said valve means in said first conduit means and one of said pilot valve means, temperature responsive means responsive to the temperature of the space, pressure responsive means responsive to pressures in said second conduit means indicative of the rate of flow through the valve means therein, means connected to and controlled jointly by said temperature responsive means and said pressure responsive means controlling said valve means in said second conduit means and the second of said pilot valves, and additional valve means connected to said remotely positioned chamber being adjustable to control discharge therefrom and hence total discharge through said discharge opening from said main mixing chamber.

7. In an air conditioning apparatus for controlling the delivery of air to a space and the temperature of the space, a mixing chamber having a discharge opening to said space, first and second conduit means containing tempered air to be delivered to said space and connected to said mixing chamber, said first and second conduit means each including a valve means for controlling the amount of tempered air from said conduits to be delivered to said space, means for simulating flow through said discharge opening of said main mixing chamber including a remotely positioned chamber having a discharge to atmosphere and connections to said first and second conduit means with small pilot valves in said connections having similar characteristics with the valves in said first and second conduit means controlling flow to said remotely positioned chamber, means responsive to pressure in said remotely positioned chamber to control one of said valve means and one of said pilot valves, means responsive to the temperature of the space for controlling the second of said valve means to control the flow of air conditioning medium through said second conduit means, additional valve means included in one of said connections from said second conduit to said remotely positioned chamber, additional pressure responsive means sensing the pressure drop across said additional valve means, and means connected to said temperature responsive means and said additional pressure responsive means controlling said valve means in said second conduit means and the second of said pilot valves.

8. In an air conditioning apparatus for controlling the delivery of air to a space and the temperature of the space, a mixing chamber having a discharge opening to said space, first and second conduit means containing tempered air to be delivered to said space and connected to said mixing chamber, said first and second conduit means each including valve means for controlling the amount of tempered air from said conduits to be delivered to said space, means for simulating the total flow from said mixing chamber through the discharge opening of the said mixing chamber including a remotely positioned chamber having a discharge to atmosphere and a source of air flows thereto similar to the flows in said first and second conduit means, a pair of pilot valves positioned in said remotely positioned chamber and having similar flow characteristics respectively to said valve means in said first and second conduit means, means including a sensor means responsive to the pressure in said remotely positioned chamber for controlling one of said valve means in said conduit means and one of said pilot valve means, temperature responsive means responsive to the temperature of the space, pressure responsive means responsive to pressures proportional to the rate of flow through said second valve means, and means connected to and controlled jointly by said temperature responsive means and said pressure responsive means controlling said valve means in said second conduit means and the second of said pilot valves.

9. In an air conditioning apparatus for controlling the delivery of air to a space and the temperature of the space, a mixing chamber having a discharge opening to said space, first and second conduit means containing tempered air to be delivered to said space and connected to said mixing chamber, said first and second conduit means each including a self-contained valve means for controlling the amount of tempered air from said conduits to be delivered to said space, means for simulating the total flow from said mixing chamber through the discharge opening of the said mixing chamber including a remotely positioned chamber having a discharge to atmosphere and a source of air flows thereto similar to the flows in said first and second conduit means, a pair of self-contained pilot valve means positioned in said remotely positioned chamber and having similar flow characteristics respectively to said self-contained valve means in said first and second conduit means, means including a sensor responsive means responsive to the pressure in said remotely positioned chamber for controlling one of said self-contained valve means in said conduit means and one of said self-contained pilot valve means, temperature responsive means responsive to the temperature of the space, pressure responsive means responsive to pressures in said second conduit means indicative of the rate of flow through the self-contained valve means therein, and means connected to and controlled jointly by said temperature responsive means and said pressure responsive means controlling said self-contained valve means in said second conduit means and the second of said pilot valves.

References Cited in the file of this patent
UNITED STATES PATENTS

| | | |
|---|---|---|
| 2,134,745 | Ziebolz et al. | Nov. 1, 1938 |
| 2,828,076 | Donahue | Mar. 25, 1958 |